United States Patent
Ahn et al.

(10) Patent No.: US 8,483,107 B2
(45) Date of Patent: Jul. 9, 2013

(54) METHOD AND APPARATUS FOR ACQUIRING RESOURCE ALLOCATION OF CONTROL CHANNEL

(75) Inventors: Joon Kui Ahn, Anyang-si (KR); Young Woo Yun, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 12/919,359

(22) PCT Filed: Mar. 13, 2009

(86) PCT No.: PCT/KR2009/001258
§ 371 (c)(1),
(2), (4) Date: Aug. 25, 2010

(87) PCT Pub. No.: WO2009/116751
PCT Pub. Date: Sep. 24, 2009

(65) Prior Publication Data
US 2011/0007673 A1  Jan. 13, 2011

Related U.S. Application Data

(60) Provisional application No. 61/036,986, filed on Mar. 16, 2008.

(51) Int. Cl.
*H04J 3/00* (2006.01)
(52) U.S. Cl.
USPC .......................................................... 370/280

(58) Field of Classification Search
USPC .......................................................... 370/280
See application file for complete search history.

(56) References Cited

U.S. PATENT DOCUMENTS

2006/0018279 A1   1/2006 Agrawal et al.

FOREIGN PATENT DOCUMENTS

| KR | 10-2007-0027999 A | 3/2007 |
| KR | 10-2007-0035869 A | 4/2007 |
| KR | 10-2008-0023606 A | 3/2008 |

OTHER PUBLICATIONS

3GPP TSG, R1-080433, Jan. 14-18, 2007, Motorola, Phich Resource signaling for TDD and FDD, entire document.*
TSG-RAN WG#1, R1-074369, Ericsson, E-mail summary taking you forward on downlink control signaling, Shanghai China, Oct. 8-12, 2007, entire document.*

* cited by examiner

*Primary Examiner* — Mark Rinehart
*Assistant Examiner* — Maharishi Khirodhar
(74) *Attorney, Agent, or Firm* — McKenna Long & Aldridge LLP

(57) ABSTRACT

A method of acquiring a resource allocation of a control channel includes acquiring a resource region of the control channel in a second subframe based on a first resource allocation of the control channel, acquiring a resource region of a second downlink channel in the second subframe based on the resource region of the control channel, and receiving a second resource allocation of the control channel on a third downlink channel in the second subframe. The third downlink channel is indicated by the second downlink channel.

12 Claims, 6 Drawing Sheets

METHOD AND APPARATUS FOR ACQUIRING RESOURCE ALLOCATION OF CONTROL CHANNEL

This application is a 35 U.S.C. §371 National Stage entry of International Application No. PCT/KR2009/001258, filed on Mar. 13, 2009, and claims priority to U.S. Provisional Application No. 61/036,986, filed on Mar. 16, 2008 each of which is hereby incorporated by reference in its entirety as if fully set forth herein.

TECHNICAL FIELD

The present invention relates to wireless communication and, more particularly, to an apparatus and method for acquiring a resource allocation of a control channel in a wireless communication system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmit (Tx) power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

As disclosed in section 6 of 3rd generation partnership project (3GPP) partnership project) TS 36.211 V8.0.0 (2007-09) "Technical Specification Group Radio Access Network; Evolved Universal Terrestrial Radio Access (E-UTRA); Physical channels and modulation (Release 8)", a physical control format indicator channel (PCFICH), a physical downlink control channel (PDCCH), a physical hybrid ARQ indicator channel (PHICH), etc., are examples of downlink control channels used in 3GPP long term evolution (LTE). The PCFICH is transmitted at a first orthogonal frequency division multiplexing (OFDM) symbol of a subframe and carries information regarding the number of OFDM symbols used to transmit control channels within the subframe. Control information transmitted through the PDCCH is referred to as downlink control information (DCI). The DCI includes uplink or downlink scheduling information or includes an uplink Tx power control command for arbitrary user equipment (UE) groups. The PHICH carries an acknowledgement (ACK)/not-acknowledgement (NACK) signal for hybrid automatic repeat request (HARM).

In the 3GPP LTE, the downlink control channels are allocated to a limited region called a control region in a subframe. However, since the PDCCH is allocated to a resource region in which a resource region used by the PCFICH and the PHICH is excluded, a UE has to know the resource region used by the PCFICH and the PHICH in order for the UE to receive the DCI transmitted on the PDCCH. Since the PCFICH uses a pre-fixed resource region in the 3GPP LTE, a base station (BS) needs to report the resource region used by the PHICH to the UE.

In section 7.4 of 3GPP TS 36.300 V8.3.0 (2007-12), system information is divided into master information block (MIB) and a number of system information blocks (SIBs). The MIB defines the most essential physical layer information of the cell required to receive further system information. SIB Type 1 which is referred to as SIB-1 contains information relevant when evaluating if a UE is allowed to access a cell and defines the scheduling of other system information blocks. The Physical Broadcast Channel (PBCH) carries the MIB.

Korean Patent Application No. 2008-0079740, entitled "METHOD FOR ACQUIRING RESOURCE REGION INFORMATION FOR PHICH AND METHOD OF RECEIVING PDCCH" filed on Aug. 14, 2008 by this applicant, discloses a technique to acquire resource region for a PHICH by using the MIB on PBCH. The MIB may include a PHICH duration in a subframe and/or the number of PHICH per subframe. The resource region may be acquired based on the information in the MIB.

The MIB on PBCH uses a fixed scheduling and includes a limited number of essential and most frequently transmitted parameters that are needed to acquire other information from the cell. If the resource region of the PHICH is invariant every subframe, it may be efficient to acquire the resource region of the PHICH based on the information in the MIB.

If the resource region used by the PHICH can vary in every subframe, a control region assigned with the control channels can be more flexibly allocated. In particular, the control region needs to be allocated more flexibly in a time division duplex (TDD) system of which the number of downlink subframes included in one radio frame is less than that of a frequency division duplex (FDD) system. However, an amount of information regarding the resource region used by the PHICH is too large to transmit the information in every subframe.

Accordingly, there is a need for a method of more flexibly allocating resources of a PHICH.

DISCLOSURE OF INVENTION

Technical Problem

The present invention provides an apparatus and method for acquiring a resource allocation of a control channel in a wireless communication system.

The present invention also provides an apparatus and method for monitoring a control channel in a wireless communication system.

Technical Solution

In an aspect, a method of acquiring a resource allocation of a control channel in a wireless communication system is provided. The method may be carried in a user equipment. The method includes receiving a first resource allocation of a control channel on a first downlink channel in a first subframe, acquiring a resource region of the control channel in a second subframe based on the first resource allocation of the control channel, acquiring a resource region of a second downlink channel in the second subframe based on the resource region of the control channel, and receiving a second resource allocation of the control channel on a third downlink channel in the second subframe, the third downlink channel being indicated by the second downlink channel.

A subframe may comprise a plurality of Orthogonal Frequency Division Multiplexing (OFDM) symbols. The subframe may be divided into a control region and a data region, and both the control channel and the second downlink channel may be allocated in a control region of the second subframe. The resource region of the control channel may not be overlapped with the resource region of the second downlink channel in the control region of the second subframe. The control region may precede the data region.

The second resource allocation may include information to acquire the resource region of the control channel in unit of a subframe. The second resource allocation may include information on the size of the resource region of the control channel and the number of control channels in a subframe.

The first downlink channel may be a Physical Broadcast Channel (PBCH), the second downlink channel may be a Physical Downlink Control Channel (PDCCH), the third downlink channel may be a Physical Shared Channel (PDSCH) and the control channel may be a Physical Hybrid-ARQ Indicator Channel (PHICH) carrying a Acknowledgement (ACK)/Not-Acknowledgement (NACK) signal for Hybrid-Automatic Repeat Request (HARM). The PDSCH may be indicated by the PDCCH whose cyclic redundancy check (CRC) is masked with System Information-Radio Network Temporary Identifier (SI-RNTI). The first resource allocation of the control channel may include a PHICH resource and a PHICH duration in the second subframe, the PHICH resource being used to acquire the number of PHICH groups, the PHICH duration indicating the number of OFDM symbols in which the PHICH is allocated. The first subframe may be a first subframe of a radio frame and the second subframe may be a sixth subframe of the radio frame. The first resource allocation of the control channel may be included in a master information block (MIB) and the second resource allocation of the control channel may be included in a system information block (SIB).

The wireless communication system may be a Time Division Duplex (TDD) system.

In another aspect, an apparatus for wireless communication includes a Radio Frequency (RF) unit to transmit and receive a radio signal, and a processor coupled with the RF unit. The processor is configured to receive a first resource allocation of a control channel on a first downlink channel in a first subframe, acquire a resource region of the control channel in a second subframe based on the first resource allocation of the control channel, acquire a resource region of a second downlink channel in the second subframe based on the resource region of the control channel, and monitor the second downlink channel in the second subframe.

The processor may further be configured to receive a second resource allocation of the control channel on a third downlink channel in the second subframe when the second downlink channel is detected, the third downlink channel being indicated by the second downlink channel. The second downlink channel may be detected when decoding of the second downlink channel is successful.

Advantageous Effects

Implementations of the technique, apparatus and methods can potentially provide one or more of the following advantages. The proposed apparatus and methods can provide relatively large amount of resource allocation of a control channel to a UE. The flexibility of resource allocation for control channels may be improved.

MODE FOR THE INVENTION

The technique, method and apparatus described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The wireless access technologies can be implemented with various wireless communication standard systems. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (Wi-Fi), IEEE 802.16 (WiMAX), IEEE 802-20, E-UTRA (Evolved-UMTS Terrestrial Radio Access) etc. 3rd generation partnership project (3GPP) long term evolution (LTE) is a part of an evolved-universal mobile telecommunications system (E-UMTS). The 3GPP LTE employs the OFDMA in downlink and employs the SC-FDMA in uplink. LTE-advance (LTE-A) is an evolution of the LTE.

For clarity, the following description will focus on the 3GPP LTE/LTE-A. However, technical features of the present invention are not limited thereto.

The technique, method and apparatus described below can be applied to a frequency division duplex (FDD) system or time division duplex (TDD) system. In the FDD system, uplink transmission and downlink transmission may use same time but different frequency bands. In the TDD system, uplink transmission and downlink transmission may use same frequency bands but different time.

Figure 1:
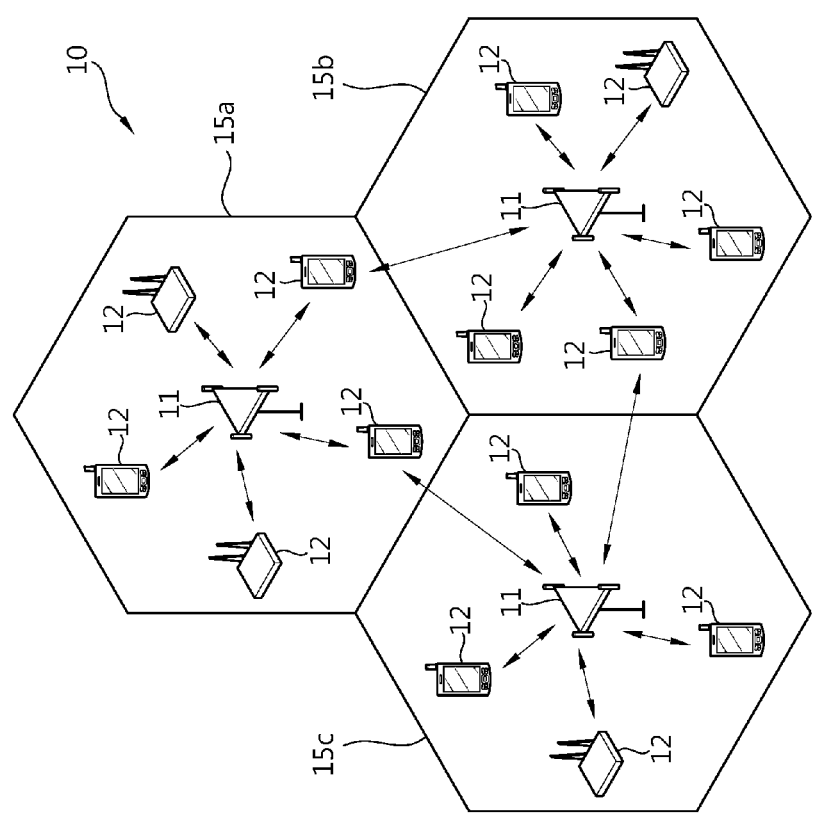
FIG. 1 shows a wireless communication system.

FIG. 1 shows a wireless communication system. A wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink denotes a communication link from the BS to the UE, and an uplink denotes a communication link from the UE to the BS. In the downlink, a transmitter may be a part of the BS, and a receiver may be a part of the UE. In the uplink, the transmitter may be a part of the UE, and the receiver may be a part of the BS.

Figure 2:
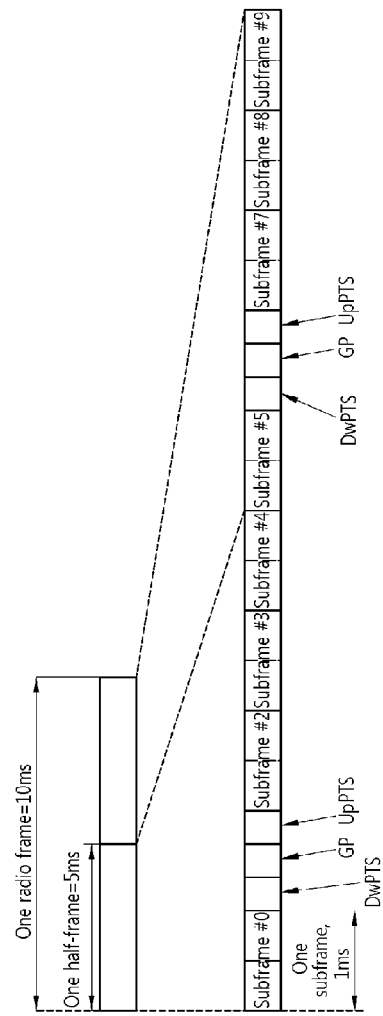
FIG. 2 shows a structure of a TDD radio frame in a 3GPP LTE system.

FIG. 2 shows a structure of a TDD radio frame in a 3GPP LTE system. This may be found in section 4.2 of 3GPP TS 36.211 V8.2.0 (2008-03) "Technical Specification Group Radio Access Network; Evolved Universal Terrestrial Radio Access (E-UTRA); Physical Channels and Modulation (Release 8)". One radio frame has a length of 10 milliseconds (ms) and consists of two half-frames each having a length of 5 ms. One half-frame consists of five subframes each having a length of 1 ms. Each subframe is used as any one of an uplink (UL) subframe, a downlink (DL) subframe, and a special subframe. One radio frame includes at least one UL subframe and at least one DL subframe.

The special subframe is a specific period positioned between the UL subframe and the DL subframe to separate uplink and downlink. One radio frame includes at leas one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a base station (BS) and uplink transmission synchronization of a user equipment (UE). The GP is positioned between uplink and downlink and is used to remove interference that occurs in uplink due to a multi-path delay of a downlink signal.

Table 1 shows a structure of a configurable frame according to arrangement of the UL subframe and the DL subframe in a 3GPP LTE TDD system. In configurations 0, 1, 2, and 6, uplink and downlink are switched with a switching point period of 5 ms. In configurations 3, 4, and 5, uplink and downlink are switched with a switching point period of 10 ms. Herein, 'D' denotes a DL subframe, 'U' denotes a UL subframe, and 'S' denotes a special subframe.

A maximum of three OFDM symbols located in a front portion of a first slot within the subframe correspond to a control region to be assigned with control channels. The remaining OFDM symbols correspond to a data region to be assigned with a physical downlink shared channel (PDSCH).

Examples of downlink control channels include a physical control format indicator channel (PCFICH), a physical downlink control channel (PDCCH), a physical hybrid-ARQ indicator channel (PHICH), etc. The PCFICH is transmitted at a first OFDM symbol of a subframe and carries information regarding the number of OFDM symbols used to transmit control channels within the subframe. Control information transmitted through the PDCCH is referred to as downlink control information (DCI). The DCI transmits uplink or downlink scheduling information or includes an uplink transmit (Tx) power control command for arbitrary UE groups. Further, the PDCCH includes resource allocation information for a system information block (SIB).

The PDCCH can carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 3:
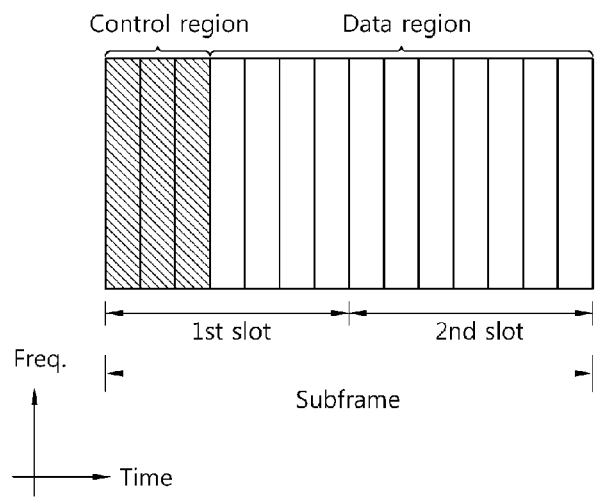
FIG. 3 shows a structure of a DL subframe.

FIG. 3 shows a structure of a DL subframe. A subframe includes two slots and 14 OFDM symbols. Each slot includes 7 OFDM symbols. A time for transmitting one subframe is defined as a transmission time interval (TTI). For example, one subframe may have a length of 1 ms, and one slot may have a length of 0.5 ms. The number of OFDM symbols included in the subframe may change according to a length of a cyclic prefix (CP) or according to a system. For example, a subframe of a normal CP may include 14 OFDM symbols whereas a subframe of an extended CP may include 12 OFDM symbols. The OFDM symbol is for expressing one symbol period since the 3GPP LTE uses OFDMA in downlink. According to a system, the OFDM symbol may be referred to as an SC-FDMA symbol or a symbol duration. A resource block (RB) is a resource allocation unit, and includes 12 consecutive subcarriers.

available PDCCH are determined according to a correlation between the number of CCEs and the coding rate provided by the CCEs.

The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC. Table 2 below shows an example of identifiers masked to the PDCCH.

TABLE 2

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

The wireless communication system can support uplink or downlink hybrid automatic repeat request (HARQ).

Figure 4:
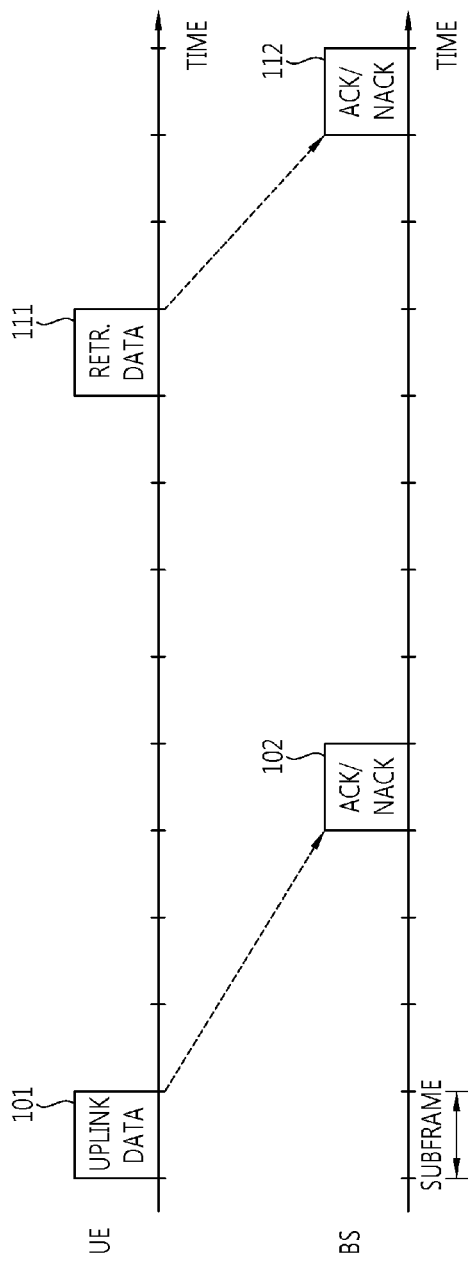
FIG. 4 shows uplink HARQ.

FIG. 4 shows uplink HARQ. A BS receives uplink data 101 from a UE on an physical uplink shared channel (PUSCH), and thereafter transmits an acknowledgement (ACK)/not-acknowledgement (NACK) signal 102 on a PHICH. The ACK/NACK signal 102 corresponds to an ACK signal when the uplink data 101 is successfully decoded, and corresponds to a NACK signal when the uplink data 101 fails in decoding. Upon receiving the NACK signal, the UE can transmit retransmission data 111 for the uplink data 101 until ACK information is received or until retransmission is performed up to a maximum number of retransmission attempts. The BS can transmit an ACK/NACK signal 112 for the retransmission data 111 on the PHICH.

Now, a PHICH configuration in the 3GPP LTE is described.

Figure 5:
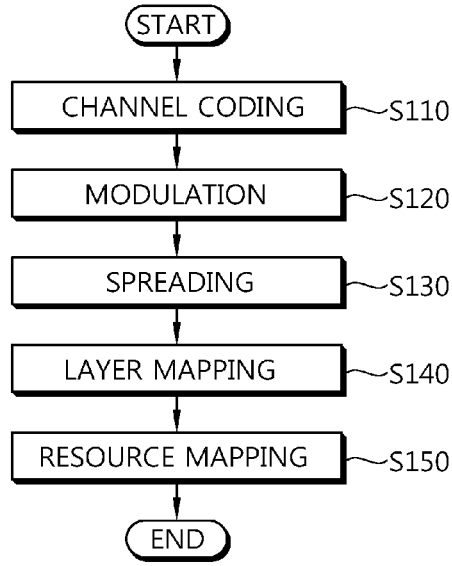
FIG. 5 is a flowchart showing the PHICH configuration.

FIG. 5 is a flowchart showing the PHICH configuration. This may be found in section 6.9 of 3GPP TS 36.211 V8.2.0 (2008-03). Since the 3GPP LTE system does not support single user-multiple input multiple output (SU-MIMO) in uplink, the PHICH carries a 1-bit ACK/NACK signal corresponding to a PUSCH for one UE. In step S110, the 1-bit ACK/NACK signal is subjected to channel coding by using repetition coding having a code rate of ⅓. In step S120, an ACK/NACK signal coded with a 3-bit codeword is mapped to three modulation symbols by binary phase shift keying (BPSK). In step S130, the modulation symbols are spread using a spreading factor (SF) $N^{PHICH}_{SF}$ and an orthogonal sequence. To apply I/Q multiplexing, the number of orthogonal sequences used for spreading is twice of $N^{PHICH}_{SF}$. $2N^{PHICH}_{SF}$ PHICHs are spread using $2N^{PHICH}_{SF}$ orthogonal sequences and are defined with one PHICH group. The PHICHs belonging to the same PHICH group are identified with different orthogonal sequences. In step S140, the spread symbols are subjected to layer mapping according to a rank. In step S150, the layer-mapped symbols are respectively mapped to resource elements.

As disclosed in section 6.9 of 3GPP TS 36.211 V8.2.0 (2008-03), a PHICH resource corresponding to the PUSCH is defined using a lowest physical resource block (PRB) index $I^{lowest\_index}_{PRB\_RA}$ of a resource used in the PUSCH and a cyclic shift $n_{DMRs}$ of a data demodulation reference signal used in the PUSCH. The demodulation reference signal is a reference signal used to demodulate data transmitted on the PUSCH. More specifically, the PHICH resource is known by an index pair ($n^{group}_{PHICH}, n^{seq}_{PHICH}$). $n^{group}_{PHICH}$ denotes a PHICH group number. $n^{seq}_{PHICH}$ denotes an orthogonal sequence index within a PHICH group, and is expressed by Equation 1 below:

Math Figure 1

$$n^{group}_{PHICH} = (I^{lowest\_index}_{PRB\_RA} + n_{DMRS}) \bmod N^{group}_{PHICH}$$

$$n^{sep}_{PHICH} = (\lfloor I^{lowest\_index}_{PRB\_RA} / N^{group}_{PHICH} \rfloor + n_{DMRS}) \bmod 2N^{PHICH}_{SF} \quad \text{[Math. 1]}$$

where 'mod' denotes a modulo operation. $n^{group}_{PHICH}$ has a value between 0 and ($N^{group}_{PHICH}-1$). $N^{group}_{PHICH}$ denotes the number of PHICH groups and is expressed by Equation 2 blow in an FDD system:

MathFigure 2

$$N^{group}_{PHICH} = \begin{cases} \lceil N_g(N^{DL}_{RB}/8) \rceil & \text{for normal cyclic prefix} \\ 2 \cdot \lceil N_g(N^{DL}_{RB}/8) \rceil & \text{for extended cyclic prefix} \end{cases} \quad \text{[Math.2]}$$

where $NL^{DL}_{RB}$ denotes a total number of resource blocks within a DL subframe, and corresponds to a DL bandwidth. A PHICH resource Ng satisfies Ng∈ {⅙, ½, 1, 2}, and is obtained from a master information block (MIB) on a physical broadcast channel (PBCH). The PHICH resource may be defined as a parameter for obtaining the number of PHICH groups.

The MIB includes resource allocation information (i.e., the PHICH resource Ng and the PHICH duration m) for acquiring a resource region of a PHICH within a control region. The PHICH duration m denotes the number of OFDM symbols that can be allocated with the PHICH in one subframe. The PHICH duration configured puts lower limit on the size of the control region signaled by the PCFICH.

The resource allocation of the PHICH is included in the MIB because the UE has to know the resource region of the PHICH to receive the PDCCH. In the control region, the PDCCH is allocated to a region except for a resource region allocated with the PCFICH and the PHICH.

Figure 6:
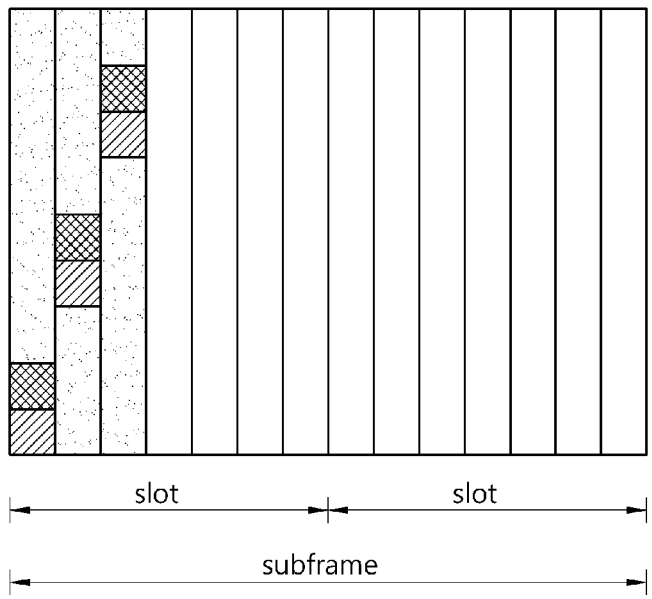
FIG. 6 shows an example in which resource regions of a PDCCH and a PHICH are allocated in a control region.

FIG. 6 shows an example in which resource regions of a PDCCH and a PHICH are allocated in a control region. It is assumed herein that a PHICH duration m is 3, and two PHICH groups exist. A UE first acquires an MIB that is system information, and then acquires a resource region of the PHICH by using resource allocation information, i.e., PHICH resource Ng and the PHICH duration m. Upon acquiring a resource allocation of the PHICH, a resource region of the PDCCH within the control region can be acquired. Thus, the PDCCH can be detected by monitoring the PDCCH within the resource region of the PDCCH. Monitoring implies attempting to decode each of the PDCCHs in the control region. When the decoding of the PDCCH is successful, the PDCCH is detected.

Now, transmission of system information in the 3GPP LTE is described.

System information is divided into the Master Information Block (MIB) and a number of System Information Blocks (SIBs). The MIB includes a limited number of most essential and most frequently transmitted parameters that are needed to acquire other information from the cell, and is transmitted on PBCH mapped to Broadcast Channel (BCH). SIBs are transmitted on PDSCH mapped to Downlink Shared Channel (DL-SCH).

There are various types of SIBs. SIBs other than SIB-1 (SIB Type 1) may flexibly be configurable by scheduling information included in the SIB-1. SIB-1 contains information relevant when evaluating if a UE is allowed to access a cell and defines the scheduling of other SIBs. SIB-2 (SIB Type2) contains common and shared channel information. SIB-3 (SIB Type3) contains cell re-selection information, mainly related to the serving cell. SIB-4 (SIB Type4) contains information about the serving frequency and intra-frequency neighboring cells relevant for cell re-selection (including cell reselection parameters common for a frequency as well as cell specific re-selection parameters). SIB-5 (SIB Type 5) contains information about other E UTRA frequencies and inter-frequency neighbouring cells relevant for cell re-selection (including cell reselection parameters common for a frequency as well as cell specific re-selection parameters). SIB-6 (SIB Type6) contains information about UTRA frequencies and UTRA neighbouring cells relevant for cell re-selection (including cell re-selection parameters common for a frequency as well as cell specific re-selection parameters). A single SI-RNTI may be used to address SIB-1 as well as other SIBs.

The MIB uses a fixed schedule with a periodicity of 40 ms and repetitions made within 40 ms. The MIB is scheduled in subframe #0 (first subframe) of radio frames. SIB-1 uses a fixed schedule with a periodicity of 80 ms and repetitions made within 80 ms. The SIB-1 is scheduled in subframe #5 (sixth subframe) of radio frames.

Figure 7:
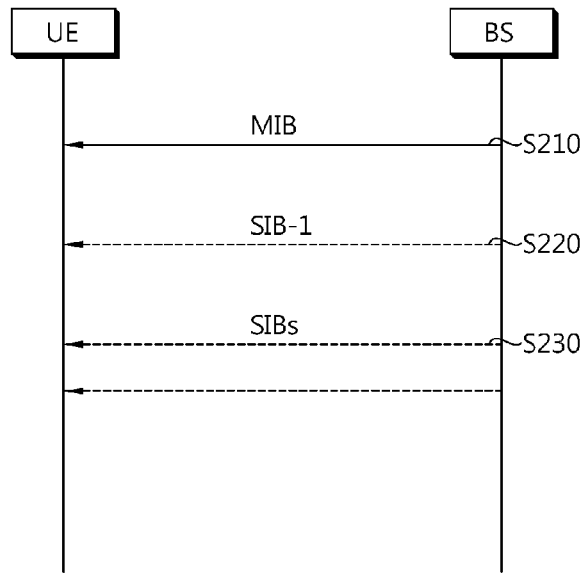
FIG. 7 is a flow diagram showing acquisition of system information.

FIG. 7 is a flow diagram showing acquisition of system information. In step S210, a UE first acquires an MIB on a PBCH. The UE acquires information regarding a resource allocation of a PHICH from the MIB. On the basis of the resource allocation of the PHICH, the UE can acquire a resource region of the PHICH, and can receive a PDCCH. In step S220, the UE can receive an SIB-1 on a PDSCH indicated by the PDCCH which is CRC-masked using an SI-RNTI. In step S230, the UE can receive other SIBs by using scheduling information included in the SIB-1.

When the aforementioned method is used, PHICH allocation cannot be modified during a transmission period (i.e., 40 ms) of the MIB. This is because the UE can know the PHICH allocation after receiving the MIB. Further, the PHICH allocation is difficult to be carried out in every subframe. This is because there is a limit in an amount of information that can be included in the MIB. In particular, the PHICH allocation may need to be modified in every subframe in a TDD system of which the number of DL subframes within one radio frame is less than that of an FDD system.

Therefore, a method capable of acquiring resource allocation information of the PHICH in every subframe is proposed for more flexible resource allocation.

Figure 8:
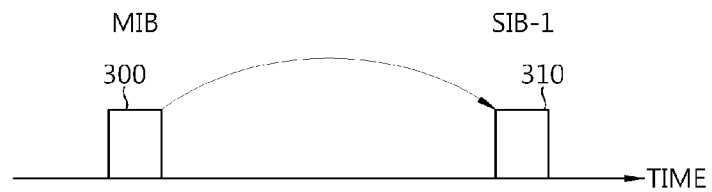
FIG. 8 shows an example of a method of acquiring a resource allocation according to an embodiment of the present invention.

FIG. 8 shows an example of a method of acquiring a resource allocation according to an embodiment of the present invention. A UE receives an MIB 300 on a PBCH, and acquires a resource allocation of a PHICH included in the MIB 300. On the basis of the resource allocation of the PHICH, the UE acquires a resource region of the PHICH in a subframe at which an SIB-1 310 is transmitted. This implies that the resource allocation of the PHICH within the MIB 300 is information for acquiring the resource region of the PHICH in a specific subframe.

Since the UE can acquire the resource region of the PHICH in the subframe at which the SIB-1 310 is transmitted, the UE can receive a PDCCH in the subframe at which the SIB-1 310 is transmitted. Therefore, the SIB-1 310 is received on a PDSCH indicated by a PDCCH on which an SI-RNTI is CRC-masked. The SIB-1 includes a resource allocation of the PHICH in a subframe unit. The resource allocation of the SIB-1 may include a PHICH resource and/or a PHICH duration in each subframe. Alternatively, the resource allocation of the SIB-1 may include a variation amount of the resource allocation received using the MIB. The SIB-1 for resource allocation can contain information with a larger amount than the MIB, and thus the SIB-1 can include a resource allocation of the PHICH corresponding to each subframe.

The above method can apply to a TDD system. For example, when the downlink-uplink configuration of Table 1 is used, the resource allocation of the PHICH can be configured for each downlink subframe.

Although the MIB indicates the resource allocation of the PHICH for reception of the SIB-1 herein, this is for exemplary purposes only, and thus various embodiments are possible. For example, the SIB-1 may indicate the resource allocation of the PHICH for reception of an SIB-2. In this case, the SIB-2 may include another form of the resource allocation of the PHICH. It can be said that a first resource allocation of a control channel for reception of second system information is acquired from first system information, and a second resource allocation of the control channel is acquired from the second system information.

Figure 9:
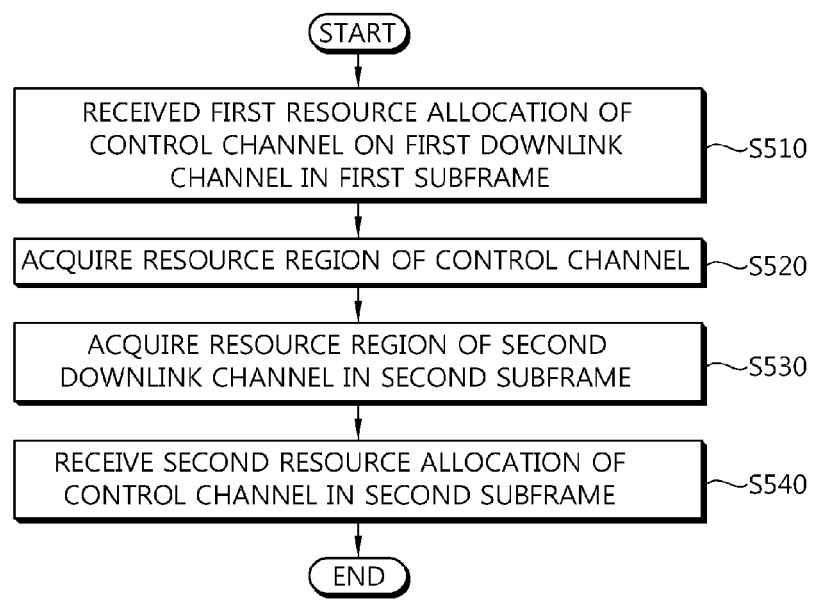
FIG. 9 is a flowchart showing a method of acquiring a resource allocation of a control channel according to an embodiment of the present invention.

FIG. 9 is a flowchart showing a method of acquiring a resource allocation of a control channel according to an embodiment of the present invention. This procedure may be carried in a UE.

Referring to FIG. 9, in step S510, a UE receives a first resource allocation of a control channel on a first downlink channel in a first subframe. The control channel may be PHICH and the first downlink channel may be PBCH. The first resource allocation may be include in a MIB on the PBCH and may include a PHICH resource and a PHICH duration in a second subframe. The PHICH resource may be used to acquire the number of PHICH groups and the PHICH duration may indicate the number of OFDM symbols in which the PHICH is allocated.

In step S520, the UE acquires a resource region of the control channel in a second subframe based on the first resource allocation of the control channel. In step S530, the UE acquires a resource region of a second downlink channel in the second subframe based on the resource region of the control channel. The second downlink channel may be PDCCH. A subframe includes a plurality of OFDM symbols. The subframe may be divided into a control region and a data region. The control region may precede the data region. Both the control channel and the second downlink channel may be allocated in a control region of the second subframe. The resource region of the control channel may not be overlapped with the resource region of the second downlink channel in the control region of the second subframe.

In step S540, the UE receives a second resource allocation of the control channel on a third downlink channel in the second subframe. The third downlink channel may be PDSCH. In the second subframe, the PDSCH may be indicated by the second downlink channel, i.e. PDCCH, whose cyclic redundancy check (CRC) is masked with System Information-Radio Network Temporary Identifier (SI-RNTI).

The second resource allocation may include information on the size of the resource region of the control channel and the number of control channels in a subframe. More specifically, the second resource allocation may include PHICH resources or PHICH durations in each downlink subframe.

The first resource allocation of the control channel is included in a MIB and the second resource allocation of the control channel is includes in a SIB, e.g. SIB-1. The first subframe in which the MIB is transmitted may be a first subframe of a radio frame and the second subframe in which the SIB-1 is transmitted may be a sixth subframe of the radio frame.

This embodiment may be applied to a TDD system in which a radio frame includes a plurality of downlink subframe and at least one uplink subframe. The radio frame may use at least one configuration among downlink-uplink configurations shown in Table 1.

Figure 10:
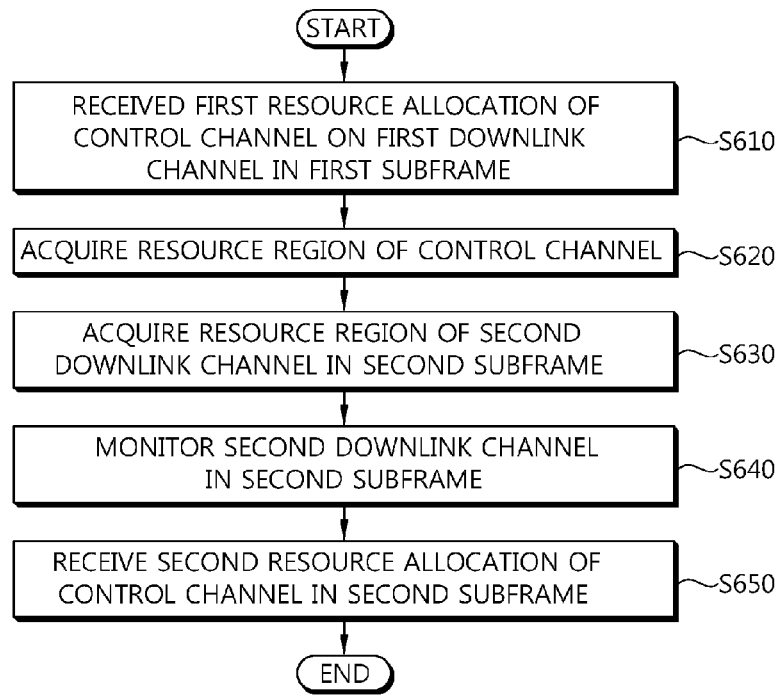
FIG. 10 is a flowchart showing a method of monitoring a control channel according to an embodiment of the present invention.

FIG. 10 is a flowchart showing a method of monitoring a control channel according to an embodiment of the present invention. This procedure may be carried in a UE.

Referring to FIG. 10, in step S610, a UE receives a first resource allocation of a control channel on a first downlink channel in a first subframe. The control channel may be PHICH and the first downlink channel may be PBCH. The first resource allocation may be include in a MIB on the PBCH and may include a PHICH resource and a PHICH duration in a second subframe. The PHICH resource may be used to acquire the number of PHICH groups and the PHICH duration may indicate the number of OFDM symbols in which the PHICH is allocated.

In step S620, the UE acquires a resource region of the control channel in a second subframe based on the first resource allocation of the control channel. In step S630, the UE acquires a resource region of a second downlink channel in the second subframe based on the resource region of the control channel. The second downlink channel may be PDCCH. A subframe includes a plurality of OFDM symbols. The subframe may be divided into a control region and a data region. The control region may precede the data region. Both the control channel and the second downlink channel may be allocated in a control region of the second subframe. The resource region of the control channel may not be overlapped with the resource region of the second downlink channel in the control region of the second subframe.

In step S640, the UE monitors the second downlink channel in the second subframe.

The PDCCH may be detected when decoding of the PDCCH is successful since the CRC of the PDCCH is masked with SI-RNTI.

In step S650, the UE receives a second resource allocation of the control channel on a third downlink channel in the second subframe. The third downlink channel may be PDSCH. In the second subframe, the PDSCH may be indicated by the second downlink channel, i.e. PDCCH. The second resource allocation may include information on the size of the resource region of the control channel and the number of control channels in a subframe. More specifically, the second resource allocation may include PHICH resources or PHICH durations in each downlink subframe.

The first resource allocation of the control channel is included in a MIB and the second resource allocation of the control channel is includes in a SIB, e.g. SIB-1. The first subframe in which the MIB is transmitted may be a first subframe of a radio frame and the second subframe in which the SIB-1 is transmitted may be a sixth subframe of the radio frame.

This embodiment may be applied to a TDD system in which a radio frame includes a plurality of downlink subframe and at least one uplink subframe. The radio frame may use at least one configuration among downlink-uplink configurations shown in Table 1.

Figure 11:
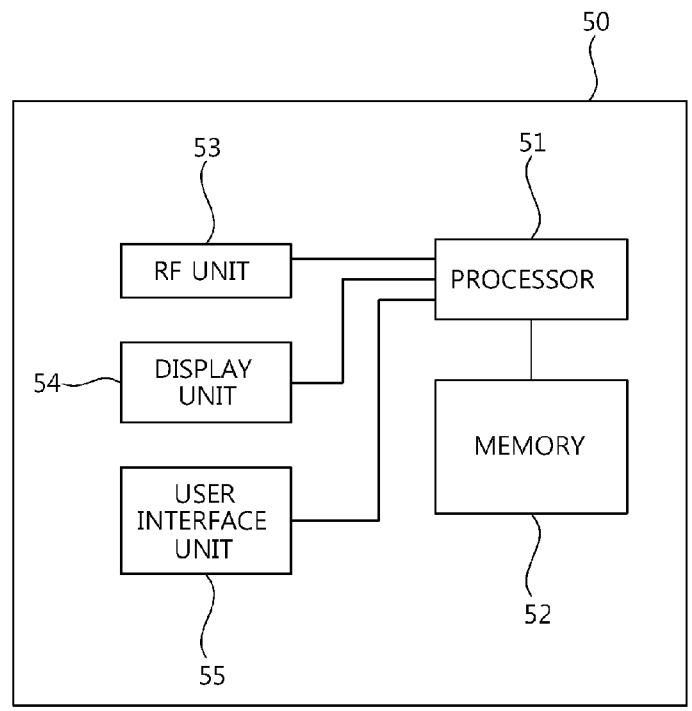
FIG. 11 is a block diagram showing an apparatus of wireless communication that may be used with the previously described embodiments.

FIG. 11 is a block diagram showing an apparatus of wireless communication that may be used with the previously described embodiments. An apparatus 50 may be a part of UE. The apparatus 50 includes a processor 51, a memory 52, a transceiver 53, a display 54, and a user interface unit 55. The processor 51 may be configured to perform procedures shown in FIGS. 8-10. The memory 52 is coupled with the processor 51 and stores a variety of information to receive control channels. The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The radio frequency (RF) unit 53 is coupled with the processor 51 and transmits and/or receives a radio signal.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of acquiring a resource allocation of a control channel in a wireless communication system, carried in a user equipment, comprising:
   receiving a first resource allocation of a control channel on a first downlink channel in a first subframe;
   acquiring a resource region of the control channel in a second subframe based on the first resource allocation of the control channel;
   acquiring a resource region of a second downlink channel in the second subframe based on the resource region of the control channel; and
   receiving a second resource allocation of the control channel on a third downlink channel in the second subframe, the third downlink channel being indicated by the second downlink channel,
   wherein the first downlink channel is a Physical Broadcast Channel (PBCH), the second downlink channel is a Physical Downlink Control Channel (PDCCH), the third downlink channel is a Physical Shared Channel (PDSCH) and the control channel is a Physical Hybrid-ARQ Indicator Channel (PHICH) carrying a Acknowledgement (ACK)/Not-Acknowledgement (NACK) signal for Hybrid-Automatic Repeat Request (HARQ).

2. The method of claim 1, wherein a subframe comprises a plurality of Orthogonal Frequency Division Multiplexing (OFDM) symbols, the subframe is divided into a control region and a data region, and both the control channel and the second downlink channel are allocated in a control region of the second subframe.

3. The method of claim 2, wherein the resource region of the control channel is not overlapped with the resource region of the second downlink channel in the control region of the second subframe.

4. The method of claim 2, wherein the control region precedes the data region.

5. The method of claim 1, wherein the second resource allocation includes information to acquire the resource region of the control channel in unit of a subframe.

6. The method of claim 5, wherein the second resource allocation includes information on the size of the resource region of the control channel and the number of control channels in a subframe.

7. The method of claim 1, wherein the PDSCH is indicated by the PDCCH whose cyclic redundancy check (CRC) is masked with System Information-Radio Network Temporary Identifier (SI-RNTI).

8. The method of claim 1, wherein the first resource allocation of the control channel includes a PHICH resource and a PHICH duration in the second subframe, the PHICH resource being used to acquire the number of PHICH groups, the PHICH duration indicating the number of OFDM symbols in which the PHICH is allocated.

9. The method of claim 1, wherein the first subframe is a first subframe of a radio frame and the second subframe is a sixth subframe of the radio frame.

10. The method of claim 1, wherein the first resource allocation of the control channel is included in a master information block (MIB) and the second resource allocation of the control channel is included in a system information block (SIB).

11. The method of claim 1, wherein the wireless communication system is a Time Division Duplex (TDD) system.

12. An apparatus for wireless communication, the apparatus comprising:
 a Radio Frequency (RF) unit configured to transmit and receive a radio signal; and
 a processor coupled with the RF unit and configured to:
 receive a first resource allocation of a control channel on a first downlink channel in a first subframe;
 acquire a resource region of the control channel in a second subframe based on the first resource allocation of the control channel;
 acquire a resource region of a second downlink channel in the second subframe based on the resource region of the control channel; and
 receive a second resource allocation of the control channel on a third downlink channel in the second subframe, the third downlink channel being indicated by the second downlink channel,
 wherein the first downlink channel is a Physical Broadcast Channel (PBCH), the second downlink channel is a Physical Downlink Control Channel (PDCCH), the third downlink channel is a Physical Shared Channel (PDSCH) and the control channel is a Physical Hybrid-ARQ Indicator Channel (PHICH) carrying a Acknowledgement (ACK)/Not-Acknowledgement (NACK) signal for Hybrid-Automatic Repeat Request (HARQ).

* * * * *